United States Patent [19]

Knudson, Jr. et al.

[11] Patent Number: 4,473,675
[45] Date of Patent: Sep. 25, 1984

[54] THIXOTROPIC CROSS-LINKABLE UNSATURATED POLYESTER COMPOSITIONS AND METHOD OF PRODUCTION

[75] Inventors: Milburn I. Knudson, Jr., Gonzales, Tex.; Frank W. Jordan, Jr., Las Vegas, Nev.

[73] Assignee: Southern Clay Products, Inc., Gonzales, Tex.

[21] Appl. No.: 463,031

[22] Filed: Feb. 1, 1983

[51] Int. Cl.³ .................. C08L 67/00; C08L 67/08; C08L 67/06; C09K 3/00
[52] U.S. Cl. .................................. 523/508; 252/193
[58] Field of Search .................. 523/508; 252/193

[56] References Cited

U.S. PATENT DOCUMENTS

| | | | |
|---|---|---|---|
| 3,974,125 | 8/1976 | Oswald et al. | 525/12 |
| 4,081,496 | 3/1978 | Finlayson | 523/508 |
| 4,216,135 | 8/1980 | Finlayson | 523/508 |
| 4,240,951 | 12/1980 | Moll et al. | 523/508 |
| 4,365,030 | 12/1982 | Oswald et al. | 523/508 |

Primary Examiner—Ronald W. Griffin
Attorney, Agent, or Firm—Stefan J. Klauber

[57] ABSTRACT

A thixotropic cross-linkable unsaturated polyester composition is provided. The composition comprises an aromatic unsaturated monomer having an amount of an organoclay dispersed therein. The organoclay comprises the reaction product of a smectite type clay and quaternary ammonium compounds. The latter are an admixture of (a) a dimethyl di(hydrogenated tallow) ammonium compound and (b) a dimethyl benzyl(hydrogenated tallow) ammonium compound. The organoclay has a quaternary ammonium compound to clay milliequivalent ratio, by weight, of at least 95, and more generally can be up to at least as high as 140, expressed on a 100% active clay basis. The cross-linkable unsaturated polyester further comprises a liquid unsaturated polyester mixed with the monomer. The amount of organoclay in the monomer and the amount of (a) and (b) are amounts sufficient to produce a cross-linkable polyester composition having a thixotropic index of at least about 2.5, and preferably of at least about 3.0. This invention also provides for the aromatic unsaturated monomer, and for processes for producing the cross-linkable polyester and the aromatic unsaturated monomer.

25 Claims, 3 Drawing Figures

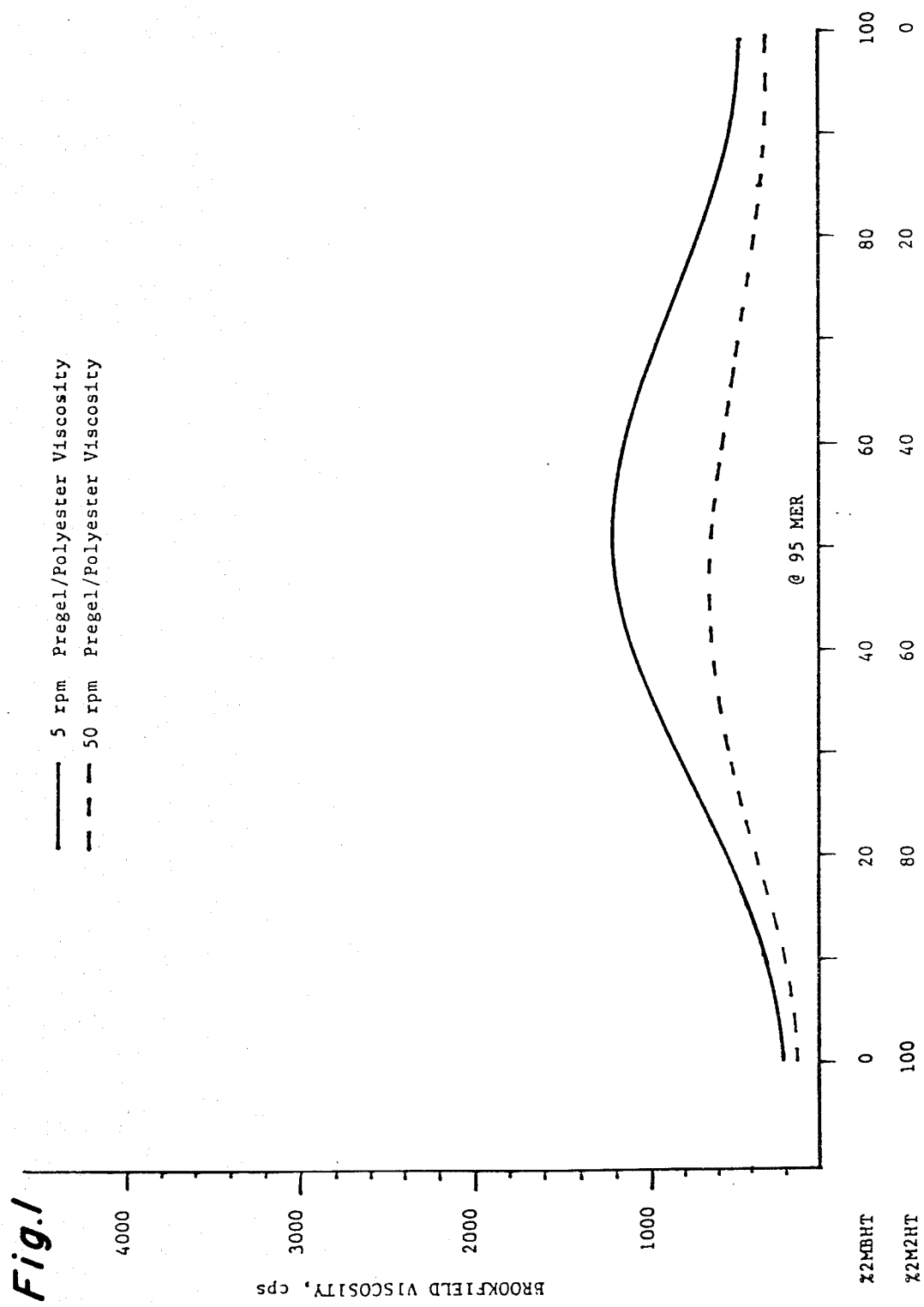

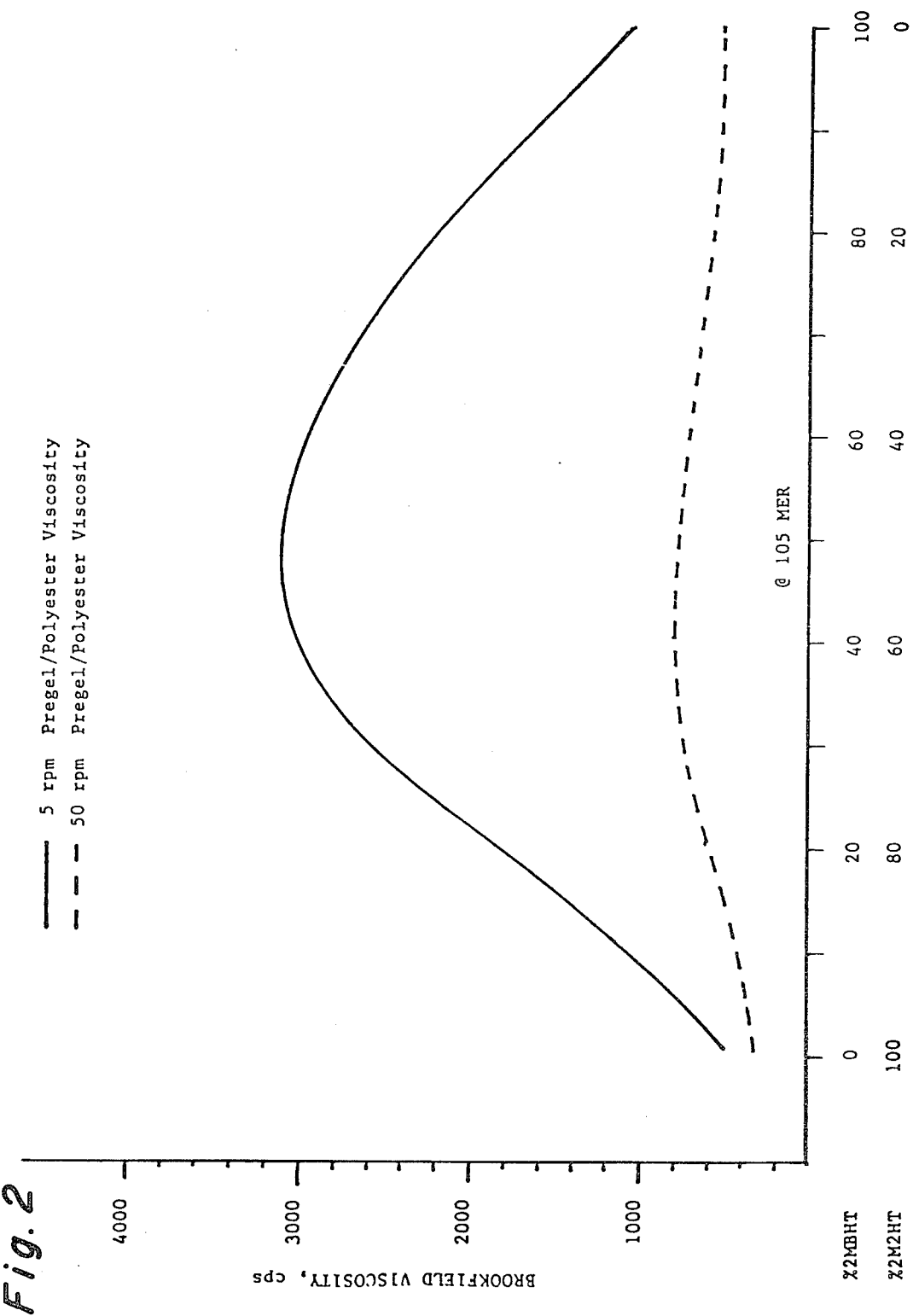

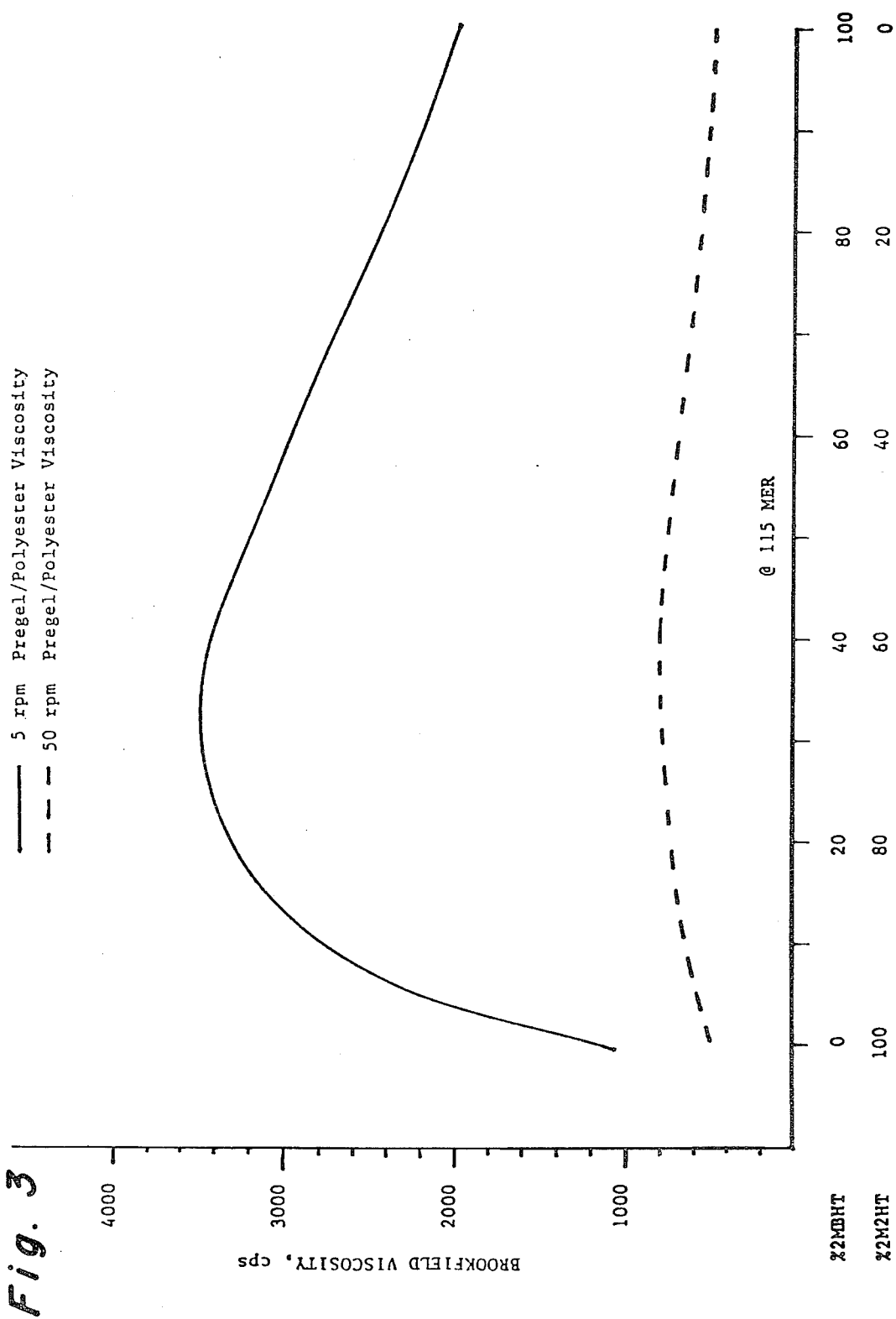

THIXOTROPIC CROSS-LINKABLE UNSATURATED POLYESTER COMPOSITIONS AND METHOD OF PRODUCTION

FIELD OF THE INVENTION

This invention relates generally to cross-linkable unsaturated polyester compositions, and more specifically relates to improved thixotropic cross-linkable unsaturated polyester compositions and improved methods for preparing such polyesters utilizing an organoclay.

PRIOR ART

Unsaturated polyester compositions containing various gelling agents are well-known. Additionally it is known that in the preparation of glass fiber laminates of unsaturated polyester and the like, thixotropic gelling agents are used which allow for the ready mixing and spraying of these resins at high-shear rates. At low-shear rates, however, these gelling agents greatly increase the viscosity of the polyester, thus avoiding the drainage of the resin on vertical surfaces.

One of the most widely used gelling agents for unsaturated polyesters was asbestos fibers. Asbestos fibers assisted in producing thixotropic polyesters without significantly affecting resin clarity. However, in the past several years, it has become recognized that the use of asbestos under the usual manufacturing conditions is objectionable, because of its long-term adverse effects on health when inhaled. For this reason, the asbestos gelling agents were replaced by a silica aerogel. When about 1% of silica was dispersed in the resin, it provided effective thixotropy. However, such product is comparatively expensive, and because of low bulk density, presents storage and handling problems.

It was also known at that time that the higher dialkyl dimethyl ammonium clays, particularly montmorillonite clays, were useful as hydrocarbon gelling agents. Such clays were e.g. sold by NL Industries under the Bentone ® trade name. One of these types of clays, dimethyl di(hydrogenated tallow) ammonium montmorillonite, was found to be a superior hydrocarbon gellant. The average carbon number of the hydrogenated tallow (i.e. higher alkyl) groups of this organoclay was 18. Subsequently, octadecyl benzyl dimethyl ammonium montmorillonite was commercially introduced by NL Industries. These two clays were used in gelling a large variety of liquid hydrocarbons.

Subsequently, Exxon Research and Engineering Company, as disclosed in U.S. Pat No. 3,974,125 to Oswald et al, disclosed a process for producing thixotropic unsaturated polyesters. The process utilized known higher dialkyl dimethyl ammonium clays, which were incorporated into the polyester by a pregel process. The process comprises mixing the quaternary ammonium clay with an unsaturated aromatic monomer, such as styrene, with sufficient shear to form a pregel, and then mixing the pregel with a major amount of an unsaturated polyester, which may also contain additional monomers, to produce a gelled polyester having thixotropic properties. The higher dialkyl groups of the dialkyl dimethyl ammonium clays used in Oswald et al contained from 14 to 24 carbon atoms, preferably 16 to 18 carbon atoms. Dioctadecyl and ditallow groups are said to be the most effective. The clays used included the natural and synthetic metal and ammonium alumino silicates with montmorillonite being preferred.

Subsequently, NL Industries, Inc., as described in U.S. Pat. No. 4,081,496 to Finlayson, developed a thixotropic polyester composition utilizing novel organophilic clay gellants, which when incorporated by the pregel method imparted good rheology to the polyester compositions. The organoclays utilized in this were the reaction product of a smectite-type clay with methyl benzyl dialkyl ammonium compounds or dibenzyl dialkyl ammonium compounds. Polyester compositions and pregels formed utilizing this organoclay were said to be characterized by high viscosities at low shear rates and high thixotropic indices. Example 2 of Finlayson compares their claimed invention using methyl benzyl di(hydrogenated tallow) ammonium bentonite with dimethyl di(hydrogenated tallow) ammonium bentonite and hectorite, and dimethyl benzyl(hydrogenated tallow) ammonium bentonite and hectorite.

U.S. Pat. No. 4,240,951 to Moll, Jr. et al, describes a method and composition for controlling the rheologcal properties of polyester-styrene resin compositions, utilizing a smectite which is reacted with a quaternary ammonium salt and added to the polyester-styrene resin mixture to produce the desired level of viscosity. The preferred quaternary ammonium salts, include dimethyl dialkyl ammonium halides and methyl sulphates and dimethyl benzyl alkyl ammonium halides and methyl sulphates wherein the alkyl group contains at least 10 carbon atoms. Those quaternary ammonium salts specifically preferred by Moll, Jr., et al, were the dimethyl di(hydrogenated tallow) ammonium and dimethyl benzyl di(hydrogenated tallow) ammonium salts.

None of these aforementioned references teach or suggest the use of an organoclay produced by the reaction product of a smectite-type clay with an organic ammonium compound which is an admixture of a dimethyl di(hydrogenated tallow) ammonium salt and a dimethyl benzyl (hydrogenated tallow) ammonium salt, nor do they teach or suggest the unexpected properties produced by the use of such organoclay on the properties of the thixotropic cross-linkable unsaturated polyester composition.

OBJECTS AND SUMMARY OF THE INVENTION

In accordance with the foregoing, it may be regarded as an object of the present invention, to provide a novel thixotropic cross-linkable unsaturated polyester composition, which has unique rheological properties, for example, a high thixotropic index.

It is a further object of this invention to provide a process for producing thixotropic cross-linkable unsaturated polyester compositions wherein the organoclay utilized in the process can be easily dispersed in the styrene monomer using low shear methods and apparatus.

It is a yet further object of this invention to provide a process for preparing a thixotropic cross-linkable unsaturated polyester composition and the aromatic unsaturated monomer used herein.

A thixotropic cross-linkable unsaturated polyester composition is provided. The composition comprises an aromatic unsaturated monomer having an amount of an organoclay dispersed therein. The organoclay comprises the reaction product of a smectite-type clay and an organic amine. The organic ammonium compound is an admixture of (a) a dimethyl di(hydrogenated tallow) ammonium compound and (b) a dimethyl benzyl(hydrogenated tallow)ammonium compound. The organoclay has an organic ammonium, compound to clay ratio of at least 95 milliequivalents per 100 g of clay. More generally, up to at least as high as 140 milliequivalents of the ammonium compound may be present per 100 g of clay, expressed on a 100% active clay basis. The cross-linkable polyester further comprises a liquid unsaturated polyester mixed with the monomer. The amount of organoclay in the monomer and the amount of (a) and (b) are amounts sufficient to produce a cross-linkable polyester composition having a thixotropic index of at least about 2.5, and preferably at least about 3.0.

This invention also provides for the aromatic unsaturated monomer, and organoclay used in such cross-linkable polyester, as well as processes for producing the cross-linkable polyester and the aromatic unsaturated monomer.

BRIEF DESCRIPTION OF DRAWINGS

In the drawings appended hereto:

FIG. 1 is a graph of the 5 rpm and 50 rpm Brookfield viscosities of pregel/polyester mixes containing organoclays prepared from blended quaternary ammonium components, over the entire range of blending, and at a first organic-to-clay ratio (MER);

FIG. 2 is a graph similar to FIG. 1, but plotting viscosities for a second MER; and FIG. 3 is a graph similar to FIGS. 1 and 2, but plotting viscosities for a third MER.

DETAILED DESCRIPTION OF THE INVENTION

The polyester composition of this invention is prepared by mixing the organoclay with the unsaturated aromatic monomer under comparatively low-shear, to form a composition having an amount of organoclay dispersed therein. This composition is then combined with a liquid unsaturated polyester, which may also contain additional unsaturated aromatic monomer, and mixed under low-shear to form the thixotropic polyester composition. The final polyester composition can then be cross-linked to produce, for example, glass fiber reinforced laminates which are well-known in the art.

Clays used to prepare the organoclay used in this invention are smectite-type clays. Particulary desirable types of clay are the naturally occurring Wyoming varieties of swelling bentonites and the like, and hectorite, a swelling magnesium-lithium silicate clay.

Clays, especially the bentonite-type clays, are preferably converted to the sodium form if they are not already in this form. This can conveniently be done by preparing an aqueous clay slurry and passing the slurry through a bed of cationic exchange material, in the sodium form. Alternatively, the clay can be mixed with water and a soluble sodium compound, such as sodium carbonate, sodium hydroxide and the like, and the mixture sheared with a pugmill or extruder.

Clays utilized to prepare the organoclays of this invention have a cationic exchange capacity of at least 75 milliequivalents per 100 grams of clay.

Smectite-type clays prepared synthetically, can also be used to prepare the organoclays. Representative of such clays are montmorillonite, bentonite, beidellite, hectorite, saponite, and stevensite. The method of preparing such clays are well known in the art, see for example the aforementioned Finlayson patent, the entire disclosure of which is incorporated herein by reference.

The organic ammonium compound reacted with the smectite-type clay, is an admixture of a dimethyl di(hydrogenated tallow) ammonium compound and a dimethyl benzyl(hydrogenated tallow) ammonium compound, preferably the quaternary ammonium salt thereof. The salt anion is preferably selected from the group consisting of chloride and bromide, and mixtures thereof, and most preferably chloride, although other anions, such as acetate, hydroxide, nitrite, etc., may be present in the quaternary ammonium salt to neutralize the quaternary ammonium cations.

The organoclays of this invention can be prepared by admixing the clay, quaternary ammonium compounds and water together, preferably at a temperature within the range of from 100° F. (38° C.) to 180° F. (82° C.), for a period of time sufficient for the organic quaternary ammonium compounds to coat the clay particles, followed by filtering, washing, drying, and grinding. Such methods are well-known in the art.

The preferred method of making the organoclay is by dispersing the clay in water at a concentration of from about 1% to about 6% by weight; the slurry is optionally centrifuged to remove non-clay impurities, the slurry agitated and heated to a temperature in the range of from about 120° F. to 180° F., and the quaternary ammonium salt admixture added to the mixture and the agitation continued to effect the reaction.

Preferably, the quaternary ammonium salt admixture contains from about 10% to 90% of the dimethyl benzyl(hydrogenated tallow) ammonium salt, and most preferably, 20% to 60%, by weight of the admixture.

The amount of the quaternary ammonium compounds added to the clay for the purposes of this invention, must be sufficient to impart to the clay the enhanced dispersion characteristics desired. Pursuant to the invention the blended organoclay used in the invention should have an organic ammonium compound to clay ratio (MER) of at least 95 milliequivalents, and can be as high as at least 140 milliequivalents. At any given amine to clay ratio, however, the mixtures of the present invention yield substantially better properties than the components used alone.

The unsaturated aromatic monomers of this invention are aromatic compounds to which are bonded one or more ethylenically unsaturated radicals, such as a vinyl radical, substituted vinyl radical, or an allylic radical. Suitable monomers include styrene, alpha-methylstyrene, divinyl benzene, and allyl benzene. Styrene is preferred due to its effectiveness, wide use and availability. Such monomers are used in cross-linking the polyesters and also act as diluents to reduce viscosity.

The unsaturated polyesters useful in preparing the thixotropic compositions of this invention are polyesters of a dicarboxylic acid and a diol having a major amount of olefinic unsaturation, preferably 10 to 75 olefinic groups per 100 ester groups. Such unsaturated polyesters are well known in the art. See for example, the aforementioned Oswald et al patent, which is incorporated herein by reference.

The amounts of organoclay used in forming the dispersions of aromatic unsaturated monomer of this invention, are sufficient, when combined with the amounts of organic amine in the admixture, to produce a cross-linkable polyester composition having a thixotropic index of at least about 2.5, and preferably above about 3.0. Generally, this can range from about 5% to about 10% by weight of the aromatic unsaturated monomer dispersion. This generally amounts to about 0.5 to 3% by weight in the thixotropic crosslinkable unsaturated polyester composition.

The amount of unsaturated polyester in the final polyester composition, can range from at least 50%, and preferably from about 50% to about 60% by weight, with the remainder being unsaturated aromatic monomer.

It is preferred to form the dispersion of unsaturated aromatic compound and organoclay by utilizing a low-speed mixing operation. Generally, applicant has found that a mixing speed of less than 500 feet per minute at the blade tip, should not be exceeded. It has unexpectedly been found that using the compositions and methods of this invention, surprising low shear is required to incorporate the organoclay into the styrene, thereby minimizing time and energy requirements.

The aromatic unsaturated dispersion using the organoclays of this invention, provide excellent dispersions, which impart excellent rheological properties to the polyester compositions.

Polyester compositions of this invention are characterized by high viscosities at low-shear rates and high thixotropic indices, i.e. at least about 2.5, and preferably at least 3. Thixotropic Index (TI) as defined herein, is the ratio of the Brookfield Viscosity in cps at 5 rpm (numerator) and 50 rpm (denominator), each measurement being after the same time of stirring, at the same temperature and using the same spindle.

The following are non-limiting Examples of this invention.

EXAMPLE I

PRODUCING ORGANOCLAYS 2500 grams of refined sodium Wyoming bentonite at 3.6% solids was heated to 135° F. and combined with an admixture of 47.7 grams of 75.5% active dimethyl di(hydrogenated tallow) ammonium chloride and 15.6 grams of 77.0 active dimethyl benzyl (hydrogenated tallow) ammonium chloride. The Wyoming bentonite had to be centrifuged to remove the non-clay impurities and had been fully dispersed. The organic ammonium admixture was preheated to 120° F. prior to addition to the slurry. The resulting organoclay slurry was mixed for 30 minutes, then filtered and washed. The wet filter cake was dried at 130° F. for 16 hours. The dried product was then ground to a fine white powder having a moisture content of around 2%.

EXAMPLE II

PRODUCING AROMATIC CLAY DISPERSION 12 grams of the organoclay from Example I was slowly added to 228 grams of inhibited styrene monomer while stirring. The mixture was allowed to mix for 10 minutes on a lab mixer, which contained a Cowles type impeller, at a speed of approximately 350 feet per minute.

EXAMPLE III

PRODUCING FINAL POLYESTER 50 grams of the organoclay/styrene pregel of Example II was then added to 243 grams of an unsaturated polyester (IC-294, Reichhold Chemical of Canada) consisting of 65% unsaturated polyester and 35% styrene. The mixture was allowed to mix for 10 minutes on a lab mixer with Cowles type blender at 1000 rpm. The final composition of this mixture contained: 54% unsaturated polyester, 45% styrene, and 1% of organoclay as the thixotropic gellant.

EXAMPLE IV

For comparison, an organoclay was prepared using 100% dimethyl di(hydrogenated tallow) ammonium chloride as the organic— using approximately the same milliequivalent ratio as the product in Example I. Both products were then tested, using the same method as described in Example II and III. Viscosity data for both are listed in Table I. Viscosities were determined using a Brookfield RVT viscometer with spindel Number 2. It will be evident that the Thixotropic Index yielded by the method of the invention is far superior to that yielded by the prior art method. MER's for each organoclay used are also set forth in the Table.

TABLE I

| Composition | Brookfield Viscosities cps at 5 and 50 RPM | | | Thixotropic Index |
|---|---|---|---|---|
| | MER | 5 RPM | 50 RPM | |
| approx. 25% 2MBHT/ approx. 75% 2M2HT | 106 | 1160 | 407 | 2.85 |
| 100% 2M2HT | 107 | 688 | 301 | 2.28 |

EXAMPLES V THROUGH VII

In FIGS. 1 through 3, 5 rpm and 50 rpm Brookfield viscosities are depicted for pregel/polyester compositions of the type prepared in Example III.

Each graph represents the entire range of blends of dimethyl benzyl(hydrogenated tallow) ammonium chloride (2MBHT) and dimethyl di(hydrogenated tallow) ammonium chloride (2M2HT) at a given organic-to-clay ratio. This ratio is referred to as the NER, which is the number of milliequivalents of the quaternary ammonium components per 100 grams of the clay component.

Thus in FIG. 1, the viscosities of the pregel/polyester mix is depicted where the MER is 95; in FIG. 2, the MER is 105; and in FIG. 3, the MER is 115. These graphs demonstrate the unexpectedly large increase in the 5 rpm Brookfield viscosities relative to the corresponding 50 rpm Brookfield viscosities of the pregel/polyester mixes containing organoclays made from blended quaternary ammonium components. Since the thixotropic index is the ratio of the 5 rpm viscosity to the 50 rpm viscosity, it can be readily seen from these graphs that not only are much higher viscosities obtained with the blended organoclay materials, but much improved thixotropic indices as well.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A thixotropic cross-linkable unsaturated polyester composition comprising:
   (A) an aromatic unsaturated monomer having an amount of an organoclay dispersed therein, wherein the organoclay comprises the reaction product of:
(i) a smectite clay; and
(ii) quaternary ammonium compounds which are an admixture of:
(a) a dimethyl di(hydrogenated tallow) ammonium compound; and
(b) from about 10% to about 90% by weight of a dimethyl benzyl(hydrogenated tallow) ammonium compound, wherein the organoclay has a quaternary ammonium to clay milliequivalent ration (MER), by weight, of at least 95, expressed on a 100% active clay basis; and
(b) a liquid unsaturated polyester; and
Wherein the amount of organoclay in the monomer and the amount of (A) and (B) are sufficient to produce a cross-linkable polyester composition having a thixotropic index of at least about 2.5.

2. A composition in accordance with claim 1, wherein the said MER is in the range of 95 to 140.

3. A composition in accordance with claim 2, wherein the said thixotropic index is at least 3.0.

4. The cross-linkable polyester composition of claim 1, wherein the amount of organoclay in the dispersion is an amount sufficient to produce from about 0.5 to 3%, by weight, organoclay in the cross-linkable polyester.

5. The cross-linkable polyester composition of claim 1, wherein the amount of organoclay dispersed in the monomer is up to about 10%, by weight, of the dispersion.

6. A composition in accordance with claim 5, wherein the amount of clay dispersed in the monomer is in the range of 6 to 8% by weight of the dispersion.

7. The cross-linkable polyester composition of claim 1, wherein the admixture (ii) contains from about 20% to about 60% of said dimethyl benzyl(hydrogenated tallow) ammonium compound.

8. An aromatic unsaturated monomer with an amount of an organoclay dispersed therein, wherein the organoclay comprises the reaction product of:
(i) a smectite clay; and
(ii) quaternary ammonium compounds which are an admixture of:
(a) a dimethyl di(hydrogenated tallow) ammonium compound; and
(b) from about 10% to about 90% by weight of a dimethyl benzyl(hydrogenated tallow) ammonium compound, wherein the organoclay has a quaternary ammonium compound to clay milliequivalent ratio, by weight, of at least 95, expressed on a 100% active clay basis; and
wherein the amount of organoclay in the dispersion and the amount of (a) and (b) are amounts sufficient, when mixed with a liquid unsaturated polyester, to produce a cross-linkable polyester composition having a thixotropic index of at least about 2.5.

9. The aromatic monomer of claim 8, wherein the amount of organoclay in the dispersion is an amount sufficient to produce from about 0.5 to 3%, by weight, organoclay in the cross-linkable polyester.

10. The aromatic monomer of claim 8, wherein the amount of organoclay in the dispersion is up to about 10%, by weight, of the dispersion.

11. A composition in accordance with claim 8, wherein the amount of clay dispersed in the monomer is in the range of 6 to 8% by weight of the dispersion.

12. The aromatic monomer of claim 8, wherein the admixture (ii) contains from about 20% to about 60% of said dimethyl benzyl(hydrogenated tallow) ammonium compound.

13. A process for preparing a thixotropic cross-linkable unsaturated polyester composition comprising:
(A) mixing an aromatic unsaturated monomer with an amount of an organoclay to form a dispersion thereof, wherein the organoclay comprises the reaction product of:
(i) a smectite clay; and
(ii) quaternary ammonium salts which are an admixture of:
(a) a dimethyl di(hydrogenated tallow) ammonium salt; and
(b) from about 10% to about 90% by weight of a dimethyl benzyl(hydrogenated tallow) ammonium salt,
wherein the organoclay has a quaternary ammonium salt to clay milliequivalent ratio (MER), by weight, of at least 95, expressed on a 100% active clay basis; and
(B) mixing the dispersion with a liquid unsaturated polyester to form a thixotropic composition, wherein the amount of organoclay in the dispersion and the amount of (a) and (b) are amounts sufficient to produce a cross-linkable polyester composition having a thixotropic index of at least about 2.5.

14. A process in accordance with claim 13, wherein the said MER is in the range of 95 to 140.

15. A process in accordance with claim 13 wherein the said thixotropic index is at least 3.0

16. The process of claim 13, wherein the amount of organoclay in the dispersion is an amount sufficient to produce from about 0.5 to 3%, by weight, organoclay in the cross-linkable polyester.

17. The process of claim 13, wherein the amount of organoclay in the dispersion is up to about 10%, by weight, of the dispersion.

18. A process in accordance with claim 13, wherein the amount of clay dispersed in the monomer is in the range of 6 to 8% by weight of the dispersion.

19. The process of claim 13, wherein the step of mixing the aromatic monomer with the organoclay is accomplished at a blade tip mixing speed of no greater than 500 feet per minute.

20. The process of claim 13, wherein the admixture (ii) contains from about 20% to about 60% of said dimethyl benzyl (hydrogenated tallow) salt.

21. A process for preparing an aromatic unsaturated monomer composition, comprising mixing an aromatic unsaturated monomer with an amount of organoclay to form a dispersion thereof, wherein the organoclay comprises the reaction product of:
(i) a smectite clay; and
(ii) quaternary ammonium salts which are an admixture of:
(a) a dimethyl di(hydrogenated tallow) ammonium salt; and
(b) about 10% to 90% by weight of a dimethyl benzyl(hydrogenated tallow) ammonium salt, wherein the organoclay has a quaternary ammonium salt to clay milliequivalent ratio (MER), by weight, of at least 95, expressed on a 100% active clay basis; and
wherein the amount of organoclay in the dispersion and the amount of (a) and (b) are sufficient, when mixed with a liquid unsaturated polyester to produce a cross-linkable polyester composition having a thixotropic index of at least about 2.5

22. A process in accordance with claim 21, wherein the said MER is in the range of 95 to 140.

23. A process in accordance with claim 21, wherein the said thixotropic index is at least 3.0.

24. The process of claim 21, wherein the mixing of the aromatic monomer with the organoclay is accomplished at a blade tip mixing speed of not greater than about 500 feet per minute.

25. The process of claim 21 wherein the admixture (ii) contains from about 20% to about 60% of said dimethyl benzyl (hydrogenated tallow) salt.

* * * * *